United States Patent
Lu et al.

(10) Patent No.: US 8,290,492 B2
(45) Date of Patent: Oct. 16, 2012

(54) HANDOVER FOR DVB-H

(75) Inventors: Xiaolin Lu, Plano, TX (US); Rao P. Venkatasadasiva, Plano, TX (US); Zigang Yang, Plano, TX (US); Anand Ganesh Dabak, Plano, TX (US); Badri Varadarajan, Mountain View, CA (US); Srinath Hosur, Plano, TX (US); Susan Yim, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 979 days.

(21) Appl. No.: 11/800,703

(22) Filed: May 4, 2007

(65) Prior Publication Data

US 2008/0273497 A1 Nov. 6, 2008

Related U.S. Application Data

(60) Provisional application No. 60/551,451, filed on Feb. 8, 2005, provisional application No. 60/746,458, filed on May 4, 2006.

(51) Int. Cl.
*H04W 36/00* (2009.01)
(52) U.S. Cl. .......................... 455/436; 455/437; 455/442
(58) Field of Classification Search ........... 455/436–439
See application file for complete search history.

(56) References Cited

U.S. PATENT DOCUMENTS

| | | | | |
|---|---|---|---|---|
| 5,542,117 | A * | 7/1996 | Hendricks et al. | 455/343.4 |
| 5,883,888 | A * | 3/1999 | St-Pierre | 370/331 |
| 6,873,612 | B1 * | 3/2005 | Steer et al. | 370/342 |
| 7,620,111 | B2 * | 11/2009 | Palin et al. | 375/260 |
| 2001/0003088 | A1 * | 6/2001 | Ogino et al. | 455/13.4 |
| 2003/0162543 | A1 * | 8/2003 | Auranen et al. | 455/436 |
| 2005/0085265 | A1 * | 4/2005 | Laroia et al. | 455/560 |
| 2005/0242860 | A1 * | 11/2005 | Yun et al. | 327/210 |
| 2005/0272429 | A1 * | 12/2005 | Walsh et al. | 455/443 |
| 2006/0189289 | A1 * | 8/2006 | Robert et al. | 455/276.1 |
| 2007/0064651 | A1 * | 3/2007 | Kim et al. | 370/331 |
| 2007/0230400 | A1 * | 10/2007 | Kuchibhotla et al. | 370/331 |

* cited by examiner

*Primary Examiner* — Marisol Figueroa
(74) *Attorney, Agent, or Firm* — Ronald O. Neerings; Wade James Brady, III; Frederick J. Telecky, Jr.

(57) ABSTRACT

A method of wireless handover in a broadcast network (FIGS. 5 and 8) is disclosed. A wireless receiver (FIG. 4) receives a first signal (N) from a first transmitter ($f_1$). The receiver measures a signal strength (RSSI) of the first signal. The strength of the first signal is compared to a first threshold ($T_0$). The receiver receives a second signal (N+3) from a second transmitter ($f_3$) in response to the step of comparing. The first and the second signals are sent to an application processor (120). The wireless receiver continues to receive the first and second signals until the application processor terminates receiving one of the first and second signals.

25 Claims, 4 Drawing Sheets

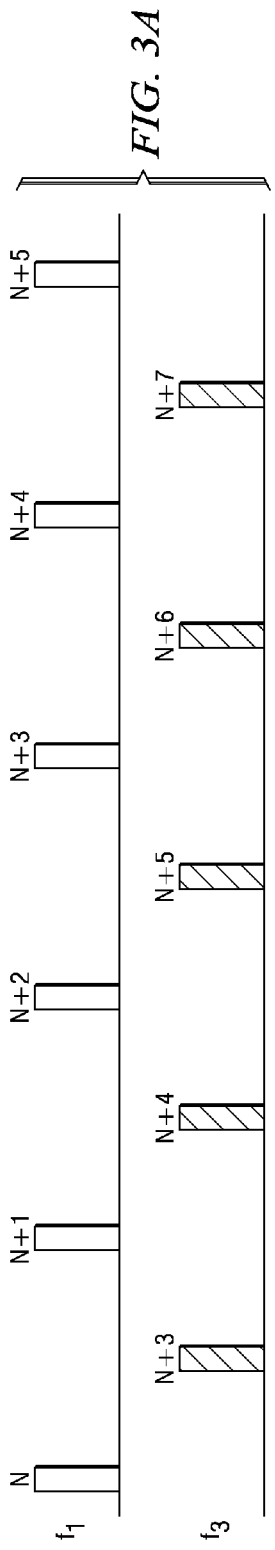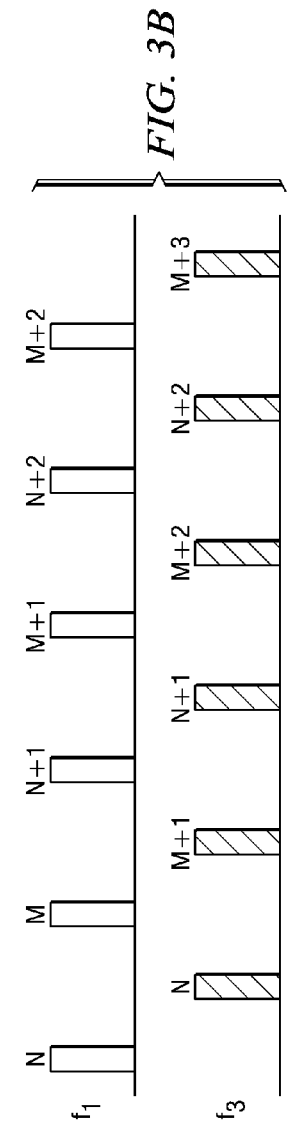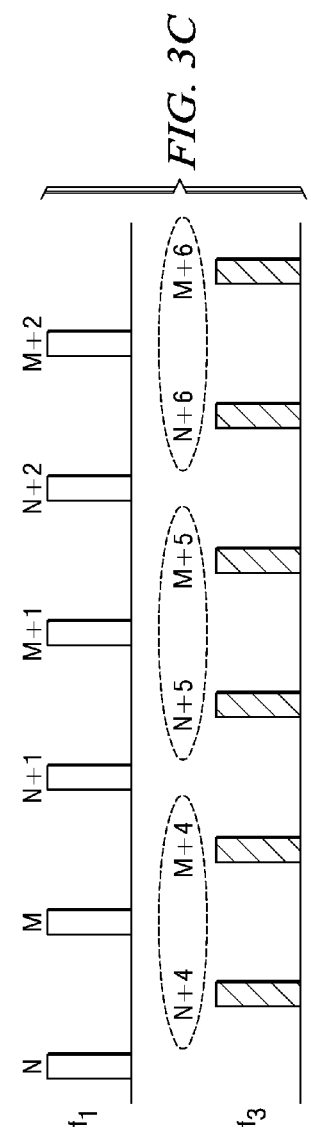

HANDOVER FOR DVB-H

CROSS-REFERENCES TO RELATED APPLICATIONS

This application claims the benefit, under 35 U.S.C. §119 (e)(1), of U.S. Provisional Application No. 60/651,451, filed Feb. 8, 2005, and Provisional Application No. 60/746,458, filed May 4, 2006, and incorporated herein by this reference.

BACKGROUND OF THE INVENTION

The present embodiments relate to wireless communications systems and, more particularly, to improved handover for Digital Video Broadcast-Handheld (DVB-H) for a wireless communication system.

Wireless communications are prevalent in business, personal, and other applications, and as a result the technology for such communications continues to advance in various areas. One such advancement includes the use of spread spectrum communications, including that of code division multiple access (CDMA) which includes wideband code division multiple access (WCDMA) cellular communications. In CDMA communications, user equipment (UE) (e.g., a hand held cellular phone, personal digital assistant, or other) communicates with a base station, where typically the base station corresponds to a "cell." CDMA communications are by way of transmitting symbols from a transmitter to a receiver, and the symbols are modulated using a spreading code which consists of a series of binary pulses. The code runs at a higher rate than the symbol rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. WCDMA includes alternative methods of data transfer, one being frequency division duplex (FDD) and another being time division duplex (TDD, where the uplink and downlink channels are asymmetric for FDD and symmetric for TDD. Another wireless standard involves time division multiple access (TDMA) apparatus, which also communicate symbols and are used by way of example in cellular systems. TDMA communications are transmitted as a group of packets in a time period, where the time period is divided into time slots so that multiple receivers may each access meaningful information during a different part of that time period. In other words, in a group of TDMA receivers, each receiver is designated a time slot in the time period, and that time slot repeats for each group of successive packets transmitted to the receiver. Accordingly, each receiver is able to identify the information intended for it by synchronizing to the group of packets and then deciphering the time slot corresponding to the given receiver. Given the preceding, CDMA transmissions are receiver-distinguished in response to codes, while TDMA transmissions are receiver-distinguished in response to time slots.

New standards for Digital Video Broadcast (DVB) standards are currently being developed to permit streaming video reception by portable user equipment. DVB packets or data streams are transmitted by Orthogonal Frequency Division Multiplex (OFDM) transmission with time slicing. With OFDM, multiple symbols are transmitted on multiple carriers that are spaced apart to provide orthogonality. An OFDM modulator typically takes data symbols into a serial-to-parallel converter, and the output of the serial-to-parallel converter is considered as frequency domain data symbols. The frequency domain tones at either edge of the band may be set to zero and are called guard tones. These guard tones allow the OFDM signal to fit into an appropriate spectral mask. Some of the frequency domain tones are set to values which will be known at the receiver, and these tones are termed pilot tones or symbols. These pilot symbols can be useful for channel estimation at the receiver. An inverse fast Fourier transform (IFFT) converts the frequency domain data symbols into a time domain waveform. The IFFT structure allows the frequency tones to be orthogonal. A cyclic prefix is formed by copying the tail samples from the time domain waveform and appending them to the front of the waveform. The time domain waveform with cyclic prefix is termed an OFDM symbol, and this OFDM symbol may be upconverted to an RF frequency and transmitted. An OFDM receiver may recover the timing and carrier frequency and then process the received samples through a fast Fourier transform (FFT). The cyclic prefix may be discarded and after the FFT, frequency domain information is recovered. The pilot symbols may be recovered to aid in channel estimation so that the data sent on the frequency tones can be recovered. A parallel-to-serial converter is applied, and the data is sent to the channel decoder.

Referring to FIG. 1, rectangles 100 and 102 represent DVB packets of a current data stream 104. The time between the start of DVB packets 100 and 102 is the delta-t time. Time between the DVB packets 100 and 102 is off time. The delta-t time is transmitted with other header information in each DVB packet to inform the DVB-H receiver when the next packet will arrive. The delta-t time is relative rather than absolute, so the DVB-H clock only needs to accurately measure the time from one packet to the next packet. Moreover, if a packet is lost, the DVB-H receiver may continue to monitor the carrier frequency 104 until the next packet arrives. This form of time slicing advantageously permits the DVB-H receiver to enter a low power mode or sleep mode after packet 100 is received. The DVB-H receiver subsequently wakes up in response to a timed interrupt to receive the next data packet 102. This method of operation greatly reduces power consumption by the DVB-H receiver and prolongs battery life. Alternatively, the DVB-H receiver may use this time between packets to monitor alternative carrier frequencies of nearby cells. These alternative carrier frequencies are provided in a Network Information Table (NIT) for each network. The NIT includes an NIT-actual, having a list of frequencies for the current network, and several NIT-other lists, each having a list of frequencies for an adjacent network.

Referring now to FIG. 2, there is an exemplary DVB multi-frequency network (MFN). The MFN includes three cells 200, 202, and 204 operating at frequencies $f_1$, $f_2$, and $f_3$, respectively. Cell 200 has a maximum radius d=3.2 km, representing approximately 0 dB gain for 16 QAM at ⅔ code rate. Radii d/2 and 2d represent 10 dB and −10 dB gain, respectively. For transmitter power of 5 kW, a digital video broadcast handheld (DVB-H) receiver 210 moving at 120 km/h would receive seamless quality of service (QoS) if a handover is completed in 48 seconds or less. This represents d/2 or 1.6 km. There are several problems, however, that are somewhat unique to DVB handovers.

FIG. 3A illustrates two data streams from neighboring cells. The upper data stream includes a series of OFDM packets N through N+5. The lower data stream includes a series of OFDM packets N+3 through N+7. The upper data stream is transmitted from a current DVB transmitter 200 operating at frequency $f_1$ which is not in synchronization with a neighboring DVB transmitter in another cell 204 operating at frequency $f_3$. A first packet N on frequency $f_1$ is followed in time by packet N+3 on frequency $f_3$. A second packet N+1 on frequency $f_1$ is followed in time by packet N+4 on frequency $f_3$. This problem typically occurs due to differing internet backbone delays and precludes a simple handover from cell 200 to cell 204.

FIG. 3B illustrates another problem when multiple data streams are transmitted with significant time shifts. Here, packets N, N+1, and N+2 of a first data stream and packets M, M+1, and M+2 of a second data stream are transmitted on frequency $f_1$ from DVB transmitter 200. The same data streams are transmitted on frequency $f_3$ from DVB transmitter 204, but packets M+1, M+2, and M+3 are shifted to the left in time. FIG. 3C illustrates yet another problem of time shifting with multiple data streams. Here, packets N, N+1, and N+2 of a first data stream and packets M, M+1, and M+2 of a second data stream are transmitted on frequency $f_1$ from DVB transmitter 200 as in FIG. 3B. However, packets N+4, N+5, and N+6 of the first data stream and packets M+4, M+5, and M+6 of the second data stream are transmitted on frequency $f_3$ from DVB transmitter 204 with a significant time shift. These problems significantly complicate handovers as the DVB-H moves from cell to cell in the MFN.

BRIEF SUMMARY OF THE INVENTION

A wireless receiver of the present invention provides seamless handovers in a digital video broadcast environment. The wireless receiver receives a first signal from a first transmitter and measures the signal strength. The signal strength is compared to a first threshold to determine if a handover is necessary. The wireless receiver receives a second signal from a second transmitter in response to the comparison. Both the first and second signals are sent to an application processor. The application processor determines when to stop receiving the first signal in the handover.

Other devices, systems, and methods are also disclosed and claimed.

BRIEF DESCRIPTION OF THE SEVERAL VIEWS OF THE DRAWING

FIG. 3A is a diagram showing an elementary data stream on each of frequencies $f_1$ and $f_3$;
FIGS. 3B and 3C are diagrams showing multiple elementary data streams on each of frequencies $f_1$ and $f_3$ and having significant packet offsets.

DETAILED DESCRIPTION OF THE INVENTION

A DVB-H user initially selects a service for reception in much the same way as one might select a channel on television. It is an object of the present invention to maintain seamless or error free reception of that service until it is complete or until the user selects a different service. Error free service, therefore, requires the DVB-H receiver to maintain uninterrupted service as the user moves from cell to cell within a single MFN or from a current MFN to a different MFN. The maintenance of service requires handovers the DVB-H from one transmitter to another as the user moves from cell to cell. In general, the DVB-H handover requires a candidate list of frequencies that may replace the current frequency. This may be achieved by use of a frequency list descriptor or by a cell frequency link descriptor. The Network Information Table (NIT) provides the frequency list descriptor for each network. The NIT includes an NIT-actual, having a list of frequencies for the current network, and several NIT-other lists, each having a list of frequencies for an adjacent network. The cell frequency link descriptor is similar to the frequency list descriptor, but it also identifies the cells for which the frequencies are valid. This information is transmitted to all network users in the Transmission Parameter Signaling (TPS) bits in the data packet header. If the cell frequency link descriptor is temporarily unavailable, the DVB-H may use service identification information to complete the handover. This information is transmitted over the network every 100 ms in the Program Association Table (PAT) which is part of the Program Specific Information (PSI).

Figure 1:
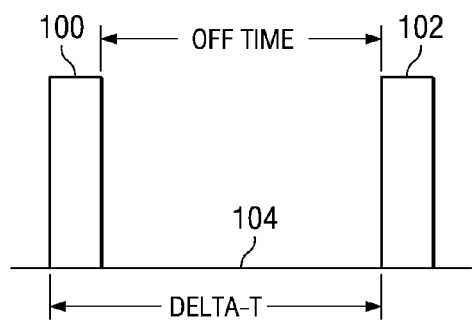
FIG. 1 is a block diagram of a OFDM data packets showing off time and delta-t time.
Figure 2:
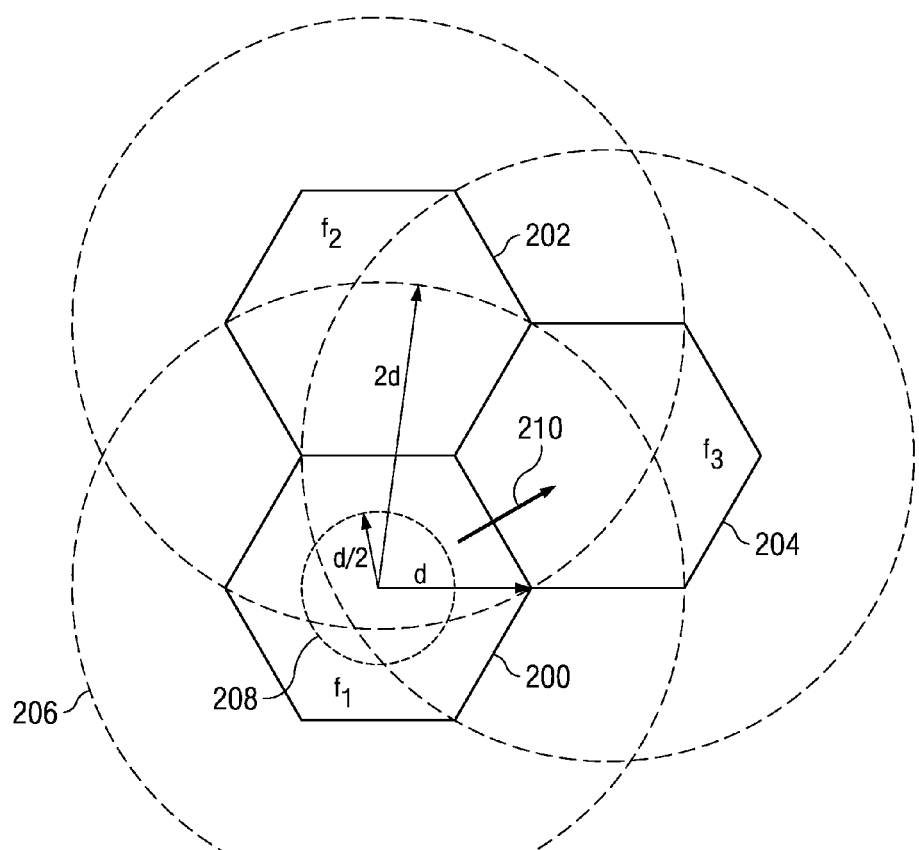
FIG. 2 is a diagram of a multiple frequency network.
Figure 4:
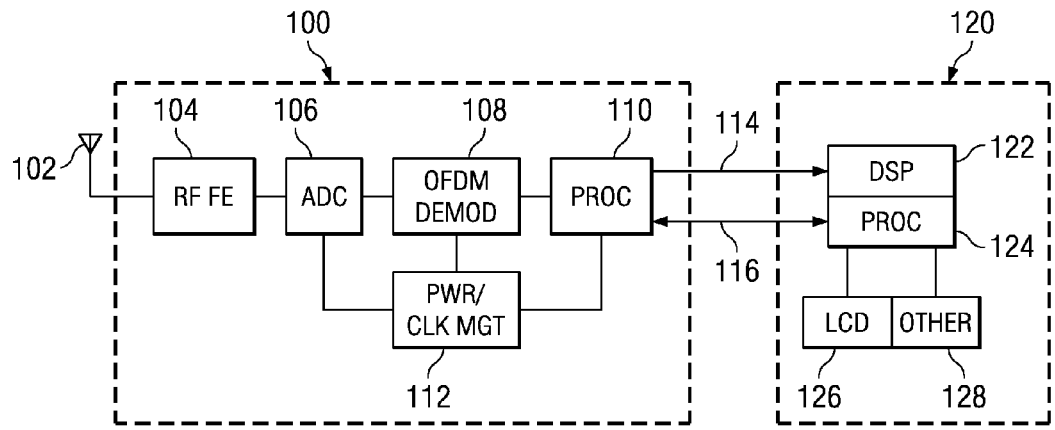
FIG. 4 is a block diagram of a DVB-H receiver of the present invention.

The preferred embodiments of the present invention provide seamless handovers for a handheld digital video broadcast receiver (DVB-H) in a wireless communication system. A wireless receiver of the present invention that performs the handover is shown at FIG. 4. The DVB-H preferably includes a wireless receiver circuit 100 and an application processor circuit 120. The wireless receiver circuit 100 includes a radio frequency (RF) front end 104 coupled to antenna 102. The RF front end relays the received data signals to analog-to-digital (ADC) converter circuit 106 to produce digital data signals. These digital data signals are applied to orthogonal frequency division multiplex (OFDM) demodulator circuit 108. Control processor 110 relays the OFDM signals to the application processor circuit 120. The application processor circuit 120 includes digital signal processor circuit 122 to decompress and decode the signals and application processor 124 to assemble the data signals. Each burst of the digital data signals includes a header with burst information including a packet number. Processor 124 uses this information to combine corresponding data burst packets into a contiguous data stream. The contiguous data stream is applied to LCD controller 126, so that it may be viewed on the DVB-H. The application processor circuit 120 includes other controllers 128 which may operate a digital camera, GPS system, heart rate monitor, or other suitable application. The application processor 120 is also referred to as a media processor and by other similar names. The DVB-H also includes a power management circuit 112 which controls sleep and wake up modes of the wireless receiver to conserve power as will be explained in detail.

Figure 5:
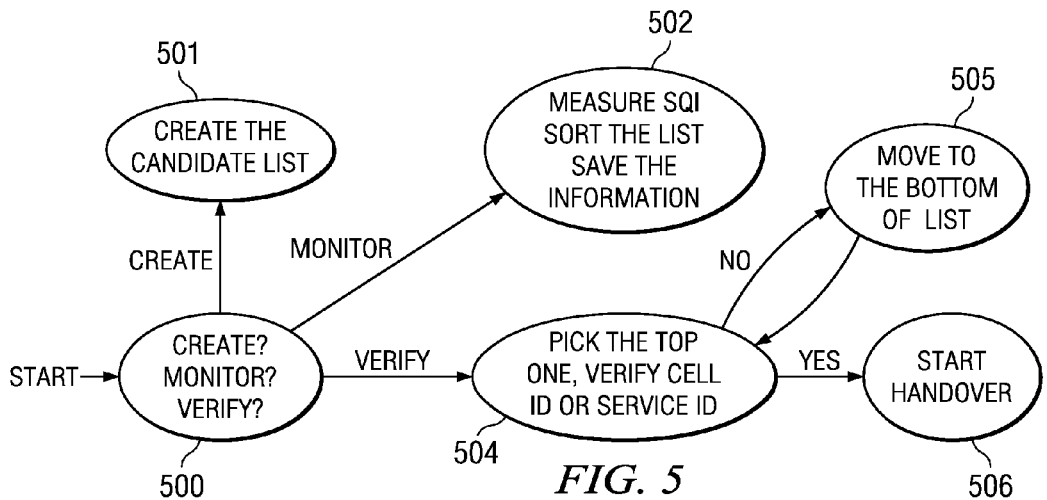
FIG. 5 is a state diagram showing candidate frequency list development and maintenance according to the present invention.

Referring now to FIG. 5, there is a state diagram showing development and maintenance of a candidate frequency list. The candidate frequency list is generated at power up and updated when a new program is selected or an old program is being removed. The candidate frequency list is preferably maintained during off time between data packet reception of the selected service. The list is preferably short and may only have 3 to 6 candidate frequencies. A list of other frequencies in a MFN is given in the NIT for the current network and in NIT-other for other networks. A short candidate frequency list can be selected based on geographical location of neighboring cell and a data stream that carries the same service of interest. This is based on the internet protocol (IP) platform identification and service identification. List creation begins at state 500. If the candidate list is not empty and the currently received signal power is degraded below a predetermined threshold, the wireless receiver 100 measures the signal quality indicator (SQI) of each frequency over several intervals. This SQI can be the averaged receive signal strength indicator (RSSI) or other quality indicator. If the SQI of the current cell (source) is low enough and the candidate SQI is high enough, the cell identification is verified at state 504. If the cell identification fails, the candidate will be moved to the end of the candidate list for lower priority monitoring, and the verification will be continued on the next best candidate until verification is succeeded or the candidate set is empty.

Figure 6:
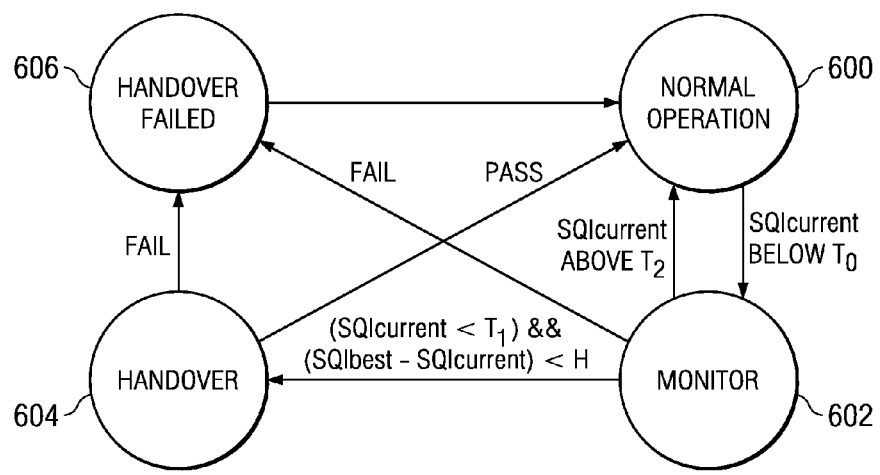
FIG. 6 is a state diagram showing operation of the DVB-H during handover according to the present invention.

Turning now to FIG. 6, there is a state diagram showing operation of the DVB-H during a handover after the candidate set of frequencies is completed. A normal operating state 600 represents a DVB-H wakeup, receiving a data packet from the current selected service, and updating the SQI. If the SQI is sufficient, the DVB-H returns to sleep mode until it receives another wake up. The DVB-H remains in this state as long as the SQI remains above a threshold value $T_0$. When the SQI falls below threshold value $T_0$, the DVB-H transitions to monitor state 602 to prepare for a possible handover. A best handover candidate is selected from the candidate set of frequencies. If the SQI of the current frequency improves to a value greater than $T_2$, the DVB-H returns to normal operation and no other action is necessary. Alternatively, if the SQI continues to deteriorate to a value less than $T_1$ and the best candidate's SQI is higher than the current SQI by a hysteresis margin H, the DVB-H moves to handover state 604. Here, data from the best handover candidate is processed together with the current data. Both streams are provided to application processor circuit 120. Application processor circuit 120 will buffer the data from both streams until data packets from the current stream duplicate data packets from the best handoff candidate. When a seamless replacement is completed, the handover is successful and the DVB-H returns to normal operation state 600. If the handover fails, however, the DVB-H moves to state 606 and the best candidate is rejected. The DVB-H then moves to normal operation state 600. If the current SQI is still inadequate, the process is repeated with another best candidate until the handover is successful. Note that the candidate set is created and maintained as previously described with regard to FIG. 5.

Figure 7:
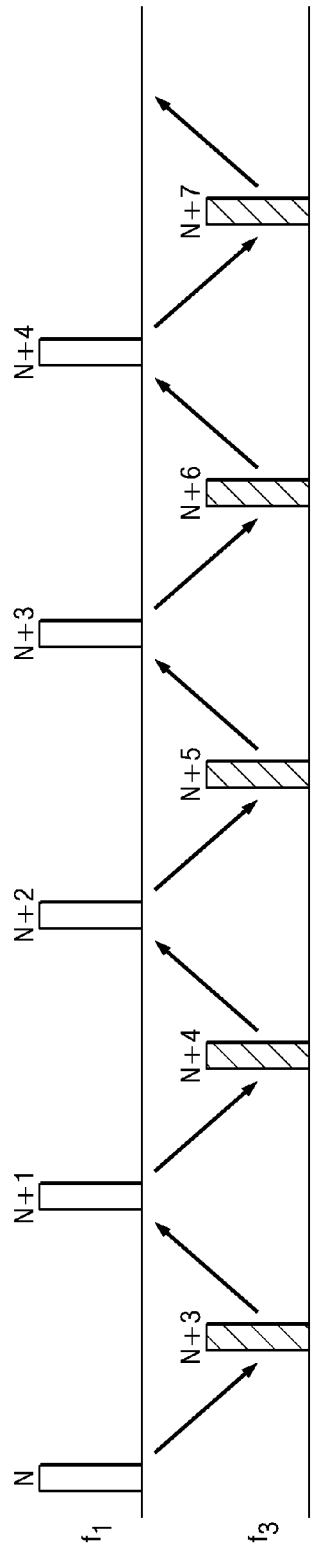
FIG. 7 illustrates handover for an elementary data stream on each of frequencies $f_1$ and $f_3$.

Operation of the DVB-H will now be explained in detail with reference to FIG. 7. The diagram of FIG. 7 illustrates reception of two elementary data streams from neighboring transmitters of a multiple frequency network prior to a handover. The upper data stream, including packets N through N+4, is currently being received by the DVB-H on frequency $f_1$. When the wireless receiver 100 determines a handover is necessary, it selects frequency $f_3$ from the candidate frequency set as a possible handover candidate. This corresponds to the monitor state 602 (FIG. 6). If the RSSI of frequency $f_1$ subsequently falls below threshold $T_1$, wireless receiver 100 initiates the handover in state 604. In this state, wireless receiver 100 processes packet N on frequency $f_1$, then packet N+3 on frequency $f_3$, then packet N+1 on frequency $f_1$, then packet N+4 on frequency $f_3$, and so on. All packets on both frequencies are sent to application processor circuit 120 (FIG. 4). Application processor circuit 120 captures the data packets and concatenates them to form a contiguous data stream for LCD controller 126 to display, for example. When the in sequence concatenated packet delivery is successful, application processor circuit 120 directs processor 110 to stop receiving data on frequency $f_1$ via control bus 116. Frequency $f_3$ then becomes the current frequency, and the DVB-H returns to normal operation state 600.

Figure 8:
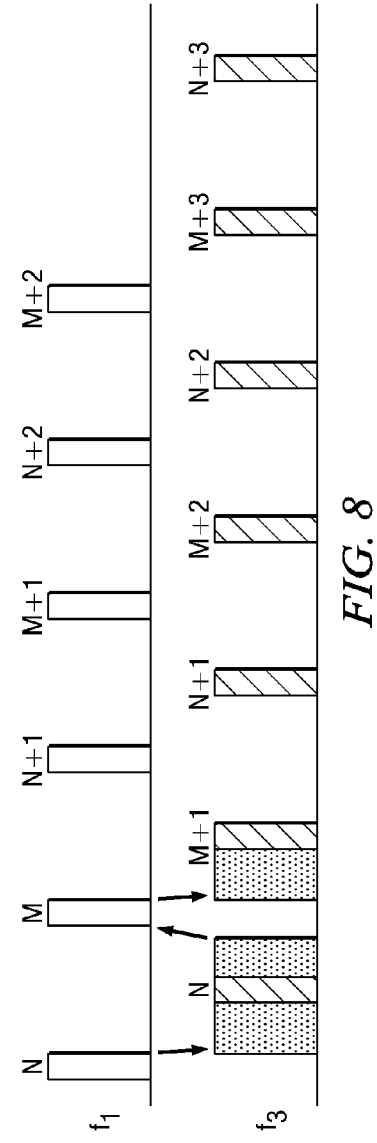
FIG. 8 illustrates handover for multiple elementary data streams on each of frequencies $f_1$ and $f_3$.

Referring now to FIG. 8, there is a diagram showing a handover for multiple elementary data streams. The diagram of FIG. 8 illustrates reception of elementary data streams N and M from neighboring transmitters of a multiple frequency network prior to a handover. The upper data stream, including packets N through N+2 and M through M+2, is currently being received by the DVB-H on frequency $f_1$. The lower data stream, including packets N through N+3 and M through M+3, is currently being received by the DVB-H on frequency $f_3$. The shaded area between the packets shows the time available for the DVB-H to monitor and update the RSSI of other candidate frequencies. As previously discussed, when the wireless receiver 100 determines a handover is necessary, it selects frequency $f_3$ from the candidate frequency set as a possible handover candidate. This corresponds to the monitor state 602 (FIG. 6). If the RSSI of frequency $f_1$ subsequently falls below threshold $T_1$, wireless receiver 100 initiates the handover in state 604. In this state, wireless receiver 100 processes packet N on frequency $f_1$, then packet N on frequency $f_3$, then packet M on frequency $f_1$, then packet M+1 on frequency $f_3$, and so on. All packets on both frequencies are sent to application processor circuit 120 (FIG. 4). Application processor circuit 120 receives the data packets and puts them in sequence to form two contiguous data streams for LCD controller 126 to display. When the above process detects a certain number of successfully received duplicate packets from both frequencies, application processor circuit 120 directs processor 110 to stop receiving data on frequency $f_1$ via control bus 116. Frequency $f_3$ then becomes the current frequency, and the DVB-H returns to normal operation state 600.

Still further, while numerous examples have thus been provided, one skilled in the art should recognize that various modifications, substitutions, or alterations may be made to the described embodiments while still falling with the inventive scope as defined by the following claims.

What is claimed is:

1. A method of wireless handover in a broadcast network, comprising the steps of:
   receiving a first signal from a first transmitter in the broadcast network;
   measuring a quality of the first signal;
   comparing the quality of the first signal to a first threshold;
   receiving a second signal from a second transmitter in the broadcast network in response to the step of comparing;
   sending the decoded data from first and the second signals to an application processor;
   buffering the first and second signals until a match between the first and second signals is achieved; and
   continuing to receive the first and second signals until the application processor terminates receiving one of the first and second signals in response to the match.

2. A method as in claim 1, wherein the first and second signals are orthogonal frequency division multiplex (OFDM) signals.

3. A method as in claim 1, wherein the broadcast network is a digital video broadcast network.

4. A method as in claim 1, wherein each of the first transmitter and the second transmitter comprise different cells of a multiple frequency network (MFN).

5. A method as in claim 1, wherein each of the first transmitter and the second transmitter comprise different cells of different multiple frequency networks (MFN).

6. A method as in claim 1, wherein the step of receiving a first signal comprises identifying a cell and a frequency of the first transmitter, and wherein the step of receiving a second signal comprises identifying a cell and a frequency of the second transmitter.

7. A method as in claim 1, wherein the application processor terminates receiving one of the first and second signals in response to receiving duplicate data signals.

8. A method as in claim 7, wherein the duplicate data signals comprise a plurality of data packets.

9. A method as in claim 8, wherein the application processor detects the duplicate data packets from the plurality of data packets and directs the wireless receiver to stop receiving one of the first and second signals.

10. A method as in claim 1, comprising selecting and maintaining a candidate set of frequencies for handover.

11. A method as in claim 10, wherein the selection of the candidate set is based on the frequencies given in the Network Information Table (NIT).

12. A method as in claim 11, wherein the candidate set is based on at least one of cell geographical information, cell size from the deployment, and a data stream with same service.

13. A method as in claim 10, wherein the first threshold adaptive at least one of a different modulation, coding scheme, the cell size, and maximum mobile speed.

14. A receiver for providing a handover in a broadcast network, comprising:
a wireless receiver circuit arranged to receive a plurality of data signals from a respective plurality of remote transmitters in the broadcast network and to measure a received signal strength for each data signal or signal quality indicator; and
an application processor circuit coupled to receive the plurality of data signals from the wireless receiver circuit, wherein the application processor buffers at least two of the plurality of signals until a match between the at least two of the plurality of signals is achieved, and wherein the application processor directs the wireless receiver to stop receiving one of the plurality of data signals in response to the match.

15. A receiver as in claim 14, wherein the plurality of data signals are orthogonal frequency division multiplex (OFDM) signals.

16. A receiver as in claim 14, wherein the broadcast network is a digital video broadcast network.

17. A receiver as in claim 14, wherein the plurality of remote transmitters comprises different cells of a multiple frequency network (MFN).

18. A receiver as in claim 14, wherein the plurality of remote transmitters comprises cells of different multiple frequency networks (MFN).

19. A receiver as in claim 14, wherein the wireless receiver comprises:
a radio frequency (RF) front end coupled to an antenna;
an analog-to-digital converter (ADC) coupled to the RF front end;
an orthogonal frequency division multiplex (OFDM) demodulator coupled to the ADC; and
a control processor coupled to the OFDM demodulator.

20. A receiver as in claim 19, comprising a power management circuit arranged to operate the wireless receiver circuit when a data signal is present and to place the wireless receiver in a low power mode at other times.

21. A receiver circuit as in claim 14, wherein the application processor comprises:
a digital signal processor coupled to receive the plurality of data signals and decompress and decode them;
a processor coupled to the digital signal processor to receive the plurality of data signals and assemble them in at least one contiguous video data stream; and
a controller circuit arranged to receive the at least one contiguous data stream.

22. A receiver as in claim 14, wherein the receiver is a handheld receiver.

23. A receiver as in claim 14, wherein the application processor controls the wireless receiver.

24. A receiver as in claim 14, wherein the application processor directs the wireless receiver to stop receiving one of the plurality of data signals in response to receiving duplicate data signals.

25. A receiver as in claim 14, wherein the wireless receiver and the application processor are formed on different semiconductor integrated circuits.

* * * * *